United States Patent
Leysen et al.

(10) Patent No.: US 8,252,861 B2
(45) Date of Patent: Aug. 28, 2012

(54) COMPOSITIONS FOR MAKING FILMS HAVING IMPROVED MECHANICAL PROPERTIES AND METHODS FOR MAKING SAME

(75) Inventors: Willy J. J. Leysen, Shanghai (CN); Hari Prakash Singh Gusain, Noida (IN); Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 132 days.

(21) Appl. No.: 12/813,165

(22) Filed: Jun. 10, 2010

(65) Prior Publication Data

US 2011/0143057 A1    Jun. 16, 2011

Related U.S. Application Data

(63) Continuation-in-part of application No. 12/779,831, filed on May 13, 2010, now Pat. No. 7,968,638, which is a continuation of application No. 11/282,906, filed on Nov. 18, 2005, now Pat. No. 7,737,206.

(51) Int. Cl.
*C08L 23/10* (2006.01)
*C08K 3/26* (2006.01)

(52) U.S. Cl. ........ 524/425; 524/502; 428/515; 428/516; 428/519; 428/523

(58) Field of Classification Search .......... 524/425, 524/502; 428/515, 516, 519, 523
See application file for complete search history.

(56) References Cited

U.S. PATENT DOCUMENTS

| | | | |
|---|---|---|---|
| 6,251,995 B1 | 6/2001 | Hesse et al. | |
| 6,852,424 B2 | 2/2005 | Dharmarajan et al. | |
| 7,737,206 B2 | 6/2010 | Ouhadi | |
| 2004/0198912 A1 | 10/2004 | Dharmarajan et al. | |
| 2005/0032959 A1* | 2/2005 | Cheung et al. ......... | 524/425 |
| 2005/0131152 A1 | 6/2005 | Dharmarajan et al. | |
| 2005/0222314 A1 | 10/2005 | Credali et al. | |
| 2006/0258811 A1 | 11/2006 | Barcus et al. | |
| 2008/0114130 A1 | 5/2008 | Ashbaugh et al. | |

FOREIGN PATENT DOCUMENTS

| | | |
|---|---|---|
| WO | 2004/099309 | 11/2004 |
| WO | 2007/102949 | 9/2007 |

OTHER PUBLICATIONS

Edward P. Moore, Jr. (Editor), *Properties of typical Polypropylenes*, Polypropylene Handbook, Hanser Publishers, Munich Vienna New York, 1996, p. 238.

* cited by examiner

*Primary Examiner* — Robert D. Harlan

(57) ABSTRACT

Film tapes comprising a blend of a masterbatch and a propylene-based polymer are provided. The masterbatch comprises a propylene-based elastomer and filler. The propylene-based elastomer has about 50 to about 99 mol % of units derived from propylene, about 1 to about 50 mol % of units derived from $C_2$-$C_{20}$ comonomer and a peak melting point temperature of 115° C. or less. The propylene-based polymer comprises about 80 to about 100 mol % units derived from propylene and a peak melting point temperature of greater than 115° C. The compositions are suitable to make carpet fiber, carpet yarn, films, film tapes, molded parts and nonwoven fabrics having excellent mechanical properties.

19 Claims, 1 Drawing Sheet

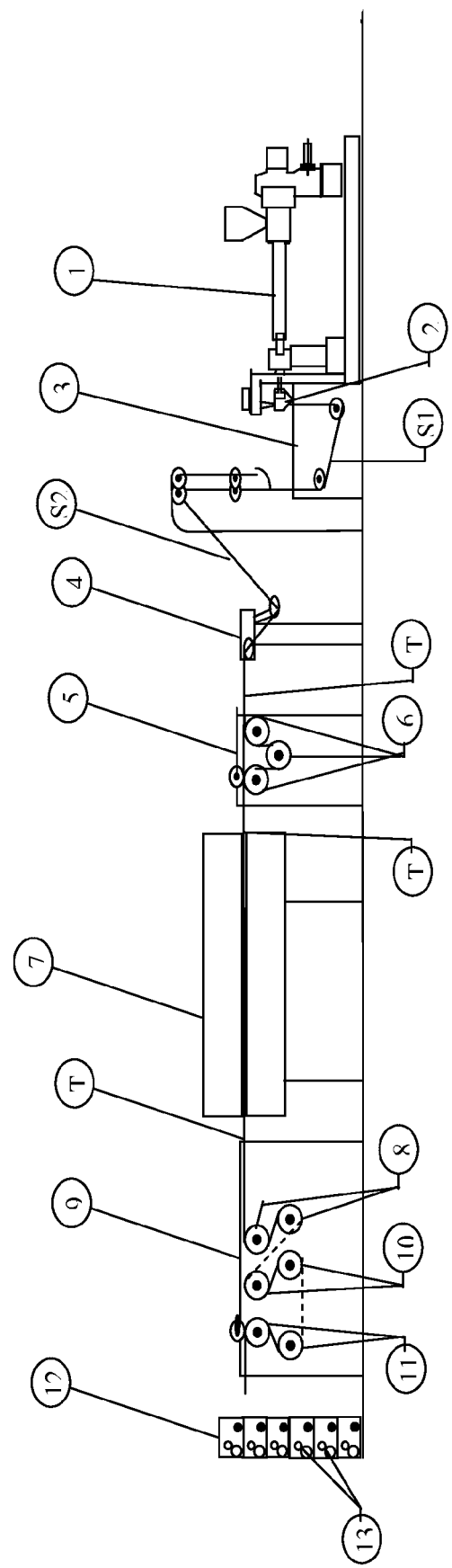

COMPOSITIONS FOR MAKING FILMS HAVING IMPROVED MECHANICAL PROPERTIES AND METHODS FOR MAKING SAME

CROSS-REFERENCE TO RELATED APPLICATIONS

This application claims priority to, and is a continuation-in part of U.S. application Ser. No. 12/779,831 filed on May 13, 2010 now U.S. Pat. No. 7,968,638, which is itself a continuation of, U.S. application Ser. No. 11/282,906 filed on Nov. 18, 2005 now U.S. Pat. No. 7,737,206, as well as, claims priority to International Application No. PCT/US2009/060510 filed Oct. 19, 2009, all of which are incorporated herein by reference in their entirety.

FIELD OF THE INVENTION

This invention relates to compositions having improved mechanical properties and methods for making same. In particular, this invention relates to compositions that are useful to make film tapes having improved tenacity and/or elongation.

BACKGROUND OF THE INVENTION

Propylene-based polymers are often used to produce articles such as fibers, films, film tapes, molded parts and nonwoven fabrics.

The propylene-based polymer may be blended with a masterbatch to increase stiffness and reduce cost. Conventional masterbatches include an ethylene-butene linear low density polyethylenes (C4-LLDPE) or homo-propylene polymers.

Manufacturers have sought to reduce costs by incorporating greater amounts of masterbatch into the compositions. However, increasing masterbatch content weakens the mechanical properties of the tapes, particularly tenacity and elongation.

That said, compositions having enhanced mechanical properties and/or having a masterbatch that can be incorporated in greater amounts to form articles (e.g., film tapes) without negatively affecting mechanical properties, is desired.

SUMMARY OF THE INVENTION

This invention relates to film tapes comprising a blend of a masterbatch and a propylene-based polymer. The masterbatch has about 5 to about 95 wt % of a propylene-based elastomer and about 5 to about 95 wt % of filler. The propylene-based elastomer has about 50 to about 99 mol % of units derived from propylene and about 1 to about 50 mol % of at least one $C_2$-$C_{20}$ comonomer, the wt % s based upon the total weight of the masterbatch, and a peak melting point temperature of about 115° C. or less. The propylene-based polymer has about 80 to about 100 mol % of units of derived from propylene and a peak melting point temperature of greater than 115° C.

This invention further relates to a process for making the compositions disclosed herein. The process comprises forming a masterbatch and blending it with a propylene-based polymer. The masterbatch is formed by blending about 5 to about 95 wt % of a propylene-based elastomer and about 5 to about 95 wt % of a filler, the wt % based upon the total weight of the masterbatch. The propylene-based elastomer has about 50 to about 99 mol % units derived from propylene, about 1 to about 50 mol % of units derived from a $C_2$-$C_{20}$ and a peak melting point temperature of about 115° C. or less. The propylene-based polymer has about 80 to about 100 mol % units derived from propylene and a peak melting point temperature of greater than 115° C. The composition can be used to form a variety of articles, such as film tapes.

BRIEF DESCRIPTION OF THE FIGURES

FIG. 1 illustrates an exemplary process for making film tape.

DETAILED DESCRIPTION OF THE INVENTION

Various specific embodiments, versions and examples of the invention will now be described, including preferred embodiments and definitions that are adopted herein for purposes of understanding the claimed invention. While the following detailed description gives specific embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

That said, an improved polymer composition is provided. The composition generally comprises a masterbatch blended with a propylene-based polymer. As used herein, the term "masterbatch" means that the components contained in the masterbatch are blended separately from other components contained in the polymer composition (e.g., the propylene-based polymer).

Such compositions may be used to form articles, such as film tapes (e.g., slit film tapes). In accordance with an aspect of the invention, articles formed of the compositions disclosed herein have improved tenacity (tensile strength divided by thickness), elongation and/or resiliency.

Masterbatch

In accordance with various embodiments, the masterbatches described herein comprise at least one propylene-based elastomer and filler.

Propylene-Based Elastomer

In various embodiments, the masterbatches described herein comprise from about 5 to about 95 wt % of one or more propylene-based elastomers (also known as "semi-amorphous polymers"), or about 10 to about 70 wt %, or about 15 to about 50 wt %, or about 20 to about 35 wt %, the wt % s based upon the total weight of the masterbatch.

In an embodiment, the propylene-based elastomer comprises about 50 to about 99 mol % of units derived from propylene, or about 70 to about 95 mol %, or about 72 to 93 mol %, the mol % based upon total units present in the propylene-based elastomer. The propylene-based elastomer may further comprise about 1 to about 50 mol % of units derived from at least one comonomer, or about 5 to about 30 mol %, or about 7 to about 28 mol %, the mol % based upon total units in the propylene-based elastomer. The comonomer may be a $C_2$ to $C_{20}$ alpha olefin selected from the group consisting of ethylene, butene, pentene, hexene, heptene, octene, nonene, and decene. The comonomer (e.g., ethylene) content of the propylene-based elastomers can be determined as described in WO 2006/065648, page 13, et seq.

In an embodiment, the masterbatch is blended with about 1 to about 45 wt % of an ethylene-based polymer, or about 5 to about 40 wt %, or about 10 to about 35 wt %, based on total weight of masterbatch. "Ethylene-based polymer" means a polymer homopolymers, copolymers, terpolymers, and/or interpolymers comprising about 50 to about 95 mol % ethylene, or about 85 to about 95 mol %, or about 90 to about 95 mol % (based on the total moles of ethylene-based polymer in the masterbatch). As used herein, a copolymer can be any polymer comprising two or more monomers.

The ethylene-based polymer comprises about 5 to about 20 mol % of units derived from at least one alpha olefin other than ethylene (e.g., ethylene copolymer), or about 5 to about 15 mol %, or about 5 to about 10 mol %, based on the total moles of ethylene-based polymer in the masterbatch, and have a CDBI greater than about 90%, or above about 95% (measured according to the techniques provided herein). In various embodiments, the ethylene copolymer has a density of about 0.86 to about 0.925 g/cm$^3$ and a CDBI of greater than about 90%, or between about 95% and about 99%. The ethylene copolymer density is determined according to ASTM D-1505. In another embodiment, the ethylene copolymer has a melt flow rate at 190° C. of about 0.1 to about 100 dg/min, or about 0.5 to about 50 dg/min, or about 0.8 to about 30 dg/min (ASTM D-1238, 190° C., 2.16 kg). Ethylene-based polymers include those commercially available from Exxon-Mobil Chemical Company in Baytown, Tex., such as those sold under the tradename EXACTT™.

In various embodiments, the propylene-based elastomer is substantially isotactic. In various embodiments, the propylene-based elastomer has a percent crystallinity of about 1 to about 30%, or about 3 to about 25%, or about 4 to about 20%, or about 5 to about 18%. Percent crystallinity is determined using the differential scanning calorimetric (DSC) procedure described in WO 2006/065648 according to ASTM E 794-85.

Propylene-based elastomers useful herein may have an intermolecular composition distribution of 75% or more, or 80% or more, or 85% or more, or 90% or more by weight of the polymer isolated as one or two adjacent, soluble fractions with the balance of the polymer in immediately preceding or succeeding fractions, wherein each of these fractions has a wt % comonomer content with a difference of no greater than 20 wt % (relative), or no greater than 10% (relative), of the average wt % comonomer of the copolymer. The fractions are obtained at temperature increases of approximately 8° C. between stages. The intermolecular composition distribution of the copolymer is determined by thermal fractionation in hexane as described in WO 2006/065648, page 14, et seq.

Propylene-based elastomers useful herein may have a melt flow rate of 2 to 35 dg/min, or 2 to 20 dg/min, or 2-8 dg/min, as measured at 230° C., and 2.16 kg, ASTM D-1238.

Propylene-based elastomers useful herein may have a peak melting point temperature (Tm) of about 115° C. or less, or from 25° C. to 110° C., or from 35° C. to 110° C. Peak Melting Point Temperature (Tm) is measured using the differential scanning calorimetric (DSC) procedure described in WO 2006/065648 according to ASTM E 794-85.

Preferred propylene-based elastomers useful herein may have a molecular weight distribution (Mw/Mn) of less than 5, or between 1.5 and 4, or between 1.5 and 3. Molecular weight (Mn and Mw) and molecular weight distribution (MWD or Mw/Mn) are determined by gel permeation chromatography using polystyrene standards as described in WO 2006/065648.

In various embodiments, polymers that are useful herein as propylene-based elastomers include homopolymers and random copolymers of propylene having a heat of fusion ($H_f$) within the range having an upper limit of 75 J/g and a lower limit of 10 J/g. $H_f$ is determined using the procedure described in WO 2006/065648 according to ASTM E 794-85.

In one embodiment, the propylene-based elastomer is a polymer with crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the useful polymers described above further include a non-conjugated diene monomer to aid in later chemical modification of the blend composition (such as crosslinking). The amount of diene present in the polymer may be less than 10% by weight, or less than about 5 wt % based upon total weight of the polymer. The diene may be any non-conjugated diene which is commonly used in ethylene propylene copolymers including, but not limited to, ethylidene norbornene, vinyl norbornene, and dicyclopentadiene.

In various embodiments, the propylene-based elastomer has a Shore A hardness (ASTM D-2240) of about 40 to about 100, or about 50 to about 95, or about 60 to about 95.

In various embodiments, the propylene-based elastomer has a 1% secant flexural modulus (ASTM D-790, 23° C.) of about 10,000 kPa to about 50,000 kPa, or about 10,000 to about 25,000, or about 10,000 kPa to about 12,000 kPa.

In various embodiments, the propylene-based elastomer has a weight average molecular weight of from about 100,000 to about 1,000,000, or from about 150,000 to about 500,000 g/mol.

The propylene-based elastomers may have a propylene tacticity index (m/r) ranging from a lower limit of 4 or 6 to an upper limit of about 8, 10, or 12. The propylene tacticity index, expressed herein as "m/r", is determined by $^{13}$C nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic material and an m/r ratio of greater than 1.0 an isotactic material. Isotactic materials theoretically have a ratio approaching infinity, and many by-product atactic polymers have sufficient isotactic content to result in ratios of greater than 50.

As used herein, isotactic propylene tacticity is defined to be an mm triad tacticity of at least 70%. Preferred propylene-based elastomers useful herein have an mm triad tacticity of three propylene units, as measured by $^{13}$C NMR, of 75% or greater, 80% or greater, 82% or greater, 85% or greater, or 90% or greater. The triad tacticity is determined from a $^{13}$C NMR spectrum of the polymer as described below and as described in U.S. Pat. No. 5,504,172. The mm triad tacticity of a polymer is the relative tacticity of a sequence of three adjacent propylene units, a chain consisting of head to tail bonds, expressed as a binary combination of m and r sequences. It is usually expressed for semi-amorphous copolymers described herein as the ratio of the number of units of the specified tacticity to all of the propylene triads in the copolymer. The mm triad tacticity (mm fraction) of a propylene copolymer can be determined from a $^{13}$C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

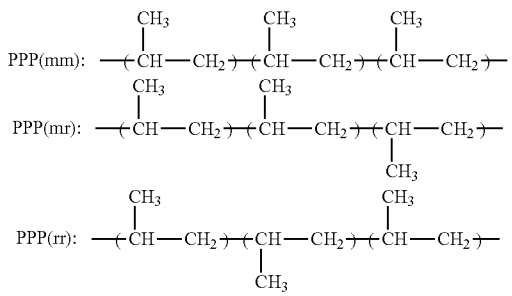

Propylene-based elastomers useful herein may be made using a metallocene catalyst system as described in WO 06/065648. Propylene-based elastomers include VISTAMAXX™ Specialty Elastomers grades 3000, 3980, 6102, 6202, and VM™ 6000 available from ExxonMobil Chemical Company in Houston, Tex. Information on preparing and using propylene-based elastomers as masterbatches is available in U.S. Pub. No. 2006/0247332 A1.

Filler

In various embodiments, the masterbatches described herein comprise about 5 to about 95 wt % of one or more fillers, or from about 30 to about 90 wt %, or from about 50 to about 85 wt %, or from about 65 to about 80 wt %, based upon total weight of the masterbatch.

In various embodiments, the filler comprises an antifibrillating compound to form an anti-fibrillating masterbatch (AFMB). For example, at least a portion of the filler may be a salt, such as an inorganic salt, which is defined as non-carbon containing ionic compounds comprising cations and anions such that the product is electrically neutral. In a preferred embodiment, the inorganic salt is calcium carbonate ($CaCO_3$).

Other suitable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, other metal oxides and carbonates, metal hydroxides, chrome, phosphorous and brominated flame retardants, antimony trioxide, silica, silicone, and compositions thereof. These fillers may include any other fillers and porous fillers known in the art, and may have the other additives (such as colorants or oils) pre-contacted, or pre-absorbed into the filler prior to addition to the blend.

Additional Masterbatch Components

In various embodiments, one or more additional polymers may be added to the masterbatch. For example, one or more polyethylenes, additional propylene-based elastomers, propylene-based polymers, ethylene-based polymers, polybutenes or other polyolefins may be added.

In various embodiments, the masterbatch has a melt flow rate of about 0.1 dg/min to about 50 dg/min, or about 2 dg/min to about 35 dg/min.

When selecting polymers to use in the masterbatch, it may be desirable to match properties such as rheological properties and/or melt flow rates. One or more polymers in the masterbatch may have similar MFRs (such as within 5 dg/min of each other, or within 3 dg/min).

Propylene-Based Polymer

In various embodiments, the compositions further comprise one or more propylene-based polymers (also known as "semi-crystalline polymers"). "Propylene-based polymer" means homopolymers, copolymers, terpolymers, and/or interpolymers, comprising about 80 to about 100 mol % of units derived from propylene, or about 90 to about 99.5 mol %, or about 95 to about 99 mol %, or 100 mol %, the mol % based upon total units in the propylene-based polymer. In a preferred embodiment, the propylene-based polymer is a propylene homopolymer. In one embodiment, the propylene-based polymer is polypropylene.

In one embodiment, each propylene-based polymer further comprises 0 to about 10 mol % of units derived from ethylene or an alpha olefin other than propylene, based upon total units present in a propylene-based polymer, or from about 0.5 to about 5 mol %, or about 1 to about 3 mol %. The alpha olefins may be $C_2$ to $C_{10}$ alpha olefins, namely, selected from the group consisting of ethylene, butene, pentene, hexene, heptene, octene, nonene, and decene. In various embodiments, the propylene-based polymer further comprises at least two alpha olefins other than propylene.

Propylene-based polymers may have a peak melting point (Tm—as measured by DSC as noted above) of greater than 115° C., or greater than about 130° C., or from about 120 to about 170° C., or from about 130 to about 165° C., or from about 140 to about 165° C., or from about 145 to about 160° C.

Propylene-based polymers may have a melt flow rate of from 0.1 to 35 dg/min or from 0.1 to 20 dg/min, or 3 to 15 dg/min, or 2-8 dg/min.

The propylene-based polymers may have an Elongation at Maximum Force of 20% or less, or 5-15%, or 10% as measured by ASTM D-638.

Suitable propylene-based polymers have a 1% Secant Flexural Modulus of from about 100,000 psi to about 250,000 psi (690 to 1720 MPa), or from about 150,000 psi to about 250,000 psi (1031 to 1720 MPa) as measured by ASTM D-790A (0.05 in/min/1.3 mm/min). "High-crystallinity propylene-based polymers," e.g., those having values above about 250,000 psi (1720 MPa) can also be used.

The molecular weight of the propylene-based polymer can be between about 10,000 to about 5,000,000 g/mol, alternatively about 25,000 to about 500,000 g/mol. In an embodiment, the propylene polymers useful herein have a molecular weight distribution (Mw/Mn) of about 5 or less, or between about 1.5 and about 4, or between about 1.5 and about 3.

Preferred propylene-based polymers may be isotactic, highly isotactic, syndiotactic, or highly syndiotactic. In one embodiment, the propylene-based polymer is an isotactic propylene-based polymer. In another embodiment, the propylene-based polymer is a highly isotactic propylene-based polymer. "Isotactic" means having at least 10% isotactic pentads, or having at least 40% isotactic pentads of methyl groups derived from propylene according to analysis by $^{13}C$-NMR as described in U.S. Pat. No. 5,504,172. "Highly isotactic" means having at least 60% isotactic pentads according to analysis by $^{13}C$-NMR as described in U.S. Pat. No. 5,504,172 and above. In an embodiment, a propylene-based polymer homo- or co-polymer having at least about 85% isotactic pentads is the propylene-based polymer. In an embodiment, the propylene-based polymer has at least about 90% syndiotactic pentads. "Syndiotactic" means having at least about 10% syndiotactic pentads, or at least about 40%, according to analysis by $^{13}$C-NMR as described in U.S. Pat. No. 5,504,172. As used herein, "highly syndiotactic" is defined as having at least 60% syndiotactic pentads according to analysis by $^{13}$C-NMR as described in U.S. Pat. No. 5,504,172.

Suitable propylene-based polymers include polymers produced by Ziegler-Natta catalyst systems, single-site (e.g., metallocene) catalyst systems, and combinations thereof. The polymers may be produced by any means including solution, slurry, gas phase, supercritical or high pressure.

In another embodiment, propylene polymers useful herein include those having a composition distribution breadth index (CDBI) of about 60% or more, or about 70% or more, or about 80% or more, or about 90% or more. CDBI is measured as described in WO 93/03093, with the modification that any fractions having a weight average molecular weight (Mw) below 25,000 g/mol are disregarded.

Preferred polypropylene polymers and polyethylene polymers that can be used in the practice herein include those propylene polymers sold by ExxonMobil Chemical Company under the trade names ACHIEVE™ and ENABLE™.

Particularly useful grades include ACHIEVE™ 3854 resin, ACHIEVE™ 1605 resin, and ENABLE™ 20-10 Series resin, ENABLE™ 35-05CH resin, and ENABLE™23-05CH resin available from ExxonMobil Chemical Company in Houston, Tex. Additional preferred propylene polymers useful in the practice herein include those propylene homopolymers, and random copolymers available from ExxonMobil Chemical Company under the grade names: PP1042, PP1032, PP1043N, PP1052, PP1063L1, PP1222F, PP5722E1, PP2252E1, PP2252E4, PP4772, PP4062C8, PP4152F2, PP4342C3, PP4352F1, PP4712E1, PP5112E1, PP5122E1, PP5032E1 and PP1572.

Additional Polymer Components

In various embodiments, the masterbatches and compositions described herein may further comprise one or more additional polymer components. Any suitable polymer may be used. For example, the additional polymer component may comprise propylene-based elastomers, low density polyethylene (density of about 0.915 to about 0.935 g/cm$^3$), linear low density polyethylene, ultra low density polyethylene (density about 0.85 to about 0.90 g/cm$^3$), very low density polyethylene (density of about 0.90 to about 0.915 g/cm$^3$), medium density polyethylene (density of about 0.935 to about 0.945 g/cm$^3$), high density polyethylene (density of about 0.945 to about 0.98 g/cm$^3$), or combinations thereof. For example, metallocene-catalyzed polyethylenes (mPEs). In a particular example, mPE homopolymers and copolymer are those produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Illustrative commercially available products are available from ExxonMobil Chemical Company, Houston, Tex., under the tradenames EXCEED™, VISTAMAXX™ and EXACT™, among others well known in the industry. Compositions where the third component is a propylene polymer or copolymer, an EP or EPDM copolymer rubber, another polyolefin (e.g., EVA ethylene vinylacetate) are also envisioned.

Composition Formation

In various embodiments, compositions disclosed herein comprise about 1 to about 99 wt % of masterbatch, or about 1 to about 70 wt %, or about 1 to about 60 wt %, or about 1 to about 50 wt %, or about 1 to about 40 wt %, based upon total weight of the composition. The composition may comprise about 1 to about 99 wt % of a propylene-based polymer, or about 30 to about 99 wt %, or about 40 to about 99 wt %, or about 50 to about 99 wt %, or about 50 to about 99 wt %, based upon the total weight of the composition.

In an exemplary embodiment, a method for preparing a composition comprises: a) forming a masterbatch comprising a propylene-based elastomer and filler; and b) blending the masterbatch with a propylene-based polymer.

In accordance with one aspect of the invention, the masterbatch is formed separately from other components of the polymer composition. It has been discovered that this method of preparation allows additional amounts of masterbatch to be incorporated into the composition and/or improved mechanical properties in articles made from the composition. In the formation of the polymer composition, it will be understood that the masterbatch may be added to the propylene-based polymer, or the propylene-cased polymer may be added to the masterbatch. The method may further comprise one or more of forming the composition into a film, slitting the film into tapes, at least partially orienting the tapes, weaving the tapes into a fabric, and forming the fabric into an article.

The compositions herein can be prepared by any procedure that causes the intimate admixture of the components. For example, they may be blended in a tumbler, static mixer, batch mixer, extruder, or a combination thereof.

The compositions may also be prepared by post-reactor mixing of the propylene-based polymer and masterbatch components. The mixing step may take place as part of a processing method used to fabricate articles, such as in the extruder on a film or tape line. Likewise, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation 10 times.

In another embodiment, the compositions herein may have a MFR (of about 0.1 to about 35 dg/min, or about 0.5 to about 15 dg/min, or about 1 to about 10.

In various embodiments, the compositions described herein are used to form a film. In one embodiment, the film forms a film tape (otherwise known as raffia tapes, film bands, strips, stretched tapes, tape yarn and mono-axially oriented tapes). The films and film tapes may be formed using various processes known in the art.

In various exemplary embodiments, the film tapes (disclosed herein may be formed by direct extrusion (i.e., extrusion without slitting the film sheet).

In various embodiments, the method may further comprise one or more of stretching the film at elevated temperature (such as by passing the film tapes through a heating medium at a temperature just below the softening temperature of the film tapes), quenching the film, annealing and/or cooling the film tapes, and winding the film tapes.

In various exemplary embodiments, the method may further comprise forming (e.g., weaving) the film tapes into fabrics and/or forming the film tapes into bags, sacks, woven sacks, large industrial sacks and packaging fabrics, geo-textiles, carpet backing, carpet fibers, carpet yarn, ropes and twines and miscellaneous industrial woven fabrics.

In various exemplary embodiments, the method may further comprise mono-axially orienting the tapes by drawing in a longitudinal direction (i.e., machine direction) or biaxially orienting the tapes, under heated conditions, to form film tapes that can be described in terms of an orientation ratio, sometimes also referred to as the draw or stretch ratio. Preferred tapes have an orientation ratio of from about 1 to about 15, or about 4 to about 12.

FIG. 1 illustrates an exemplary process for making film tape. The method includes: extruding the polymer composition comprising a blend of the masterbatch and propylene-based polymer are extruded through screw extruder 1, which is equipped with extrusion die 2 to produce molten film sheet S1. Molten film sheet S1 enters cooling device 3 (e.g. a water bath) and solidifies as film sheet S2. Film sheet S2 is then fed under tension to film slitting unit 4, which slits the film sheet S2 into a plurality of film tapes T. Film tapes T may be contained in holding unit 5 prior to being fed through first set of rollers 6, which are generally at ambient temperature. Film tapes T (i.e., slit film tapes) are then processed through heating device 7 (e.g., a hot plate, heated rollers or a convection heating device, such as a hot air oven, which may be operated at a temperature between 95° C. and 175° C.) to higher speed rollers 8, typically referred as stretching rollers, where slit films T are oriented in the machine direction (e.g., to a stretch ratio of between 4 and 12. Slit film tapes T are then annealed by passing them over heated rollers 10. In an exemplary embodiment, heated rollers 10 may be maintained at a temperature between 90° C. and 130° C. Heated rollers 10 may be run at approximately the same speed as the stretching rollers 8. Film tapes T are then passed over cooled rollers 11, which may be operated at reduced surface speed than the stretching rollers 8 to anneal slit film T. Cooled rollers 11 may be cooled to a temperature between 15° C. and 25° C. The annealing ratio may be between 0.90 and 0.98. Film tapes T are then wound on winding device 12 (e.g., cylindrical bobbins) comprising a plurality of winders 13.

As shown, stretching rollers 8, heated annealing rollers 10 and the cooled rollers 11 can be mounted on individual frames or mounted on a common frame, known as stretching aid annealing unit 9. However, it will be understood that any suitable method or equipment may be used to mount the rollers.

In various embodiments, there may be an auxiliary pressure roller resting on the film tapes in normal operation to provide a better controlled feed from last roller of each unit to the next operation. This roller can be lifted and turned to one side when threading the film tapes.

In an exemplary embodiment, the film tapes are laminated, by extrusion lamination or other means, to other monolayer or multilayer films.

In addition to the processes described above, the film tapes can be prepared by any fabricating mode recognized in the industry, such as film casting or film blowing. Film tapes can also be produced from extruded cast flat or tubular (blown) film.

The tapes may also be made by methods illustrated in WO 2006/037571. According to this method, prior to the drawing process the group of film tapes (strips) is separated into several sub-groups of film tapes and then sub-groups are drawn separately at high speed.

Film Properties

In various exemplary embodiments, the film tapes disclosed herein have one or more of the following properties:

A tenacity of at least about 4 gpd, or at least about 5 gpd, or at least about 5.5 gpd (i.e., grams-force per denier). Tenacity is defined as the tensile stress divided by tape weight in denier. Tensile stress is determined according to ASTM D-882. Denier (measure of weight of the tape) is defined as the weight in grams of a tape yarn of 9000 meters in length; and/or a percent elongation of at least about 18%, or at least about 21%, or at about least 24%. Percent elongation is defined as the elongation expressed as a percentage of the gage length as determined by ASTM D-882.

EXAMPLES

Prophetic

The compositions listed in Tables A and B are prepared in a compounding extruder operating at a temperature above the melting temperature for all polymeric components. The blend is then processed on a commercially available Raffia tape line (such as a Konark Raffia Tape Line or a JP Industries Tape Stretching Line equipped with a 0.5 to 2 m die running at 250 to 430 kg/hour and at an extrusion temperature of about 200 to 300° C.). The blend is extruded through the die to form a cast film. The cast film is pulled over one or more cast film rollers which are set at the same of different temperatures to optionally pre-orient the film. The film is then passed through a slit die which cuts the film into a plurality of tapes of 1 mm to 10 cm in width. The tapes are them passed into an oven (set at 130 to 200° C.) and stretched in the machine direction to 100 to 12,000% of their original length. The tapes are then passed over a cool roll and wound onto spools. The splitter gap is 5 to 10 mm.

Propylene-based Polymer (SA-1)—homo-propylene-based polymer PP5032E3, an isotactic homopropylene-based polymer, having an MFR of 3 dg/min and a peak melting point of about 160° C.

Comparative Masterbatch (SA-2)—20 wt % ethylene-butene linear low density polyethylene (C4-LLDPE) blended with 80 wt % calcium carbonate ($CaCO_3$), the wt % based upon total weight of the masterbatch.

Inventive Masterbatch (SA-3)—20 wt % Vistamaxx 6202, a propylene-ethylene elastomer having about 15 wt % ethylene content by weight of the elastomer, an MFR of 20.0 dg/min, an mm triad tacticity of 90% mm, and a heat of fusion of 1 J/g blended with 80 wt % calcium carbonate, the wt % based upon total weight of the masterbatch.

TABLE A

| | Comparative Example | | | | |
|---|---|---|---|---|---|
| Ex | 1 | 2 | 3 | 4 | 5 |
| SA-1 (wt %) | 65 | 70 | 80 | 85 | 95 |
| SA-2 (wt %) | 35 | 30 | 20 | 15 | 5 |

TABLE B

| | Inventive Example | | | | |
|---|---|---|---|---|---|
| Ex | 1 | 2 | 3 | 4 | 5 |
| SA-1 (wt %) | 65 | 70 | 80 | 85 | 95 |
| SA-3 (wt %) | 35 | 30 | 20 | 15 | 5 |

For the same polymer to filler blending ratio in the masterbatch in the comparative and inventive examples, it is expected that the inventive composition will produce films having increased elongation (e.g., greater than about 18%) and/or tenacity (e.g., greater than 4 gpd). Moreover, using the inventive composition, it is expected that the masterbatch content could be increased while increasing stretch ratio, without sacrificing other properties.

The films may be woven into a fabric to be used for the production of bags or to be extrusion coated with a layer of Vistamaxx or to be extrusion laminated to a reverse printed biaxially-oriented propylene-based polymer (BOPP) film using Vistamaxx as bonding layer.

The present invention can be further described as follows:
1. Film tapes comprising a blend of:
    (a) about 1 to about 99 wt % of a masterbatch comprising:
        (i) about 5 to about 95 wt % of a propylene-based elastomer, the wt % based upon total weight of the masterbatch, the propylene-based elastomer having:
            A. about 50 to about 99 mol % of units derived from propylene;
            B. about 1 to about 50 mol % of units derived from at least one $C_2$-$C_{20}$ comonomer; and
            C. a peak melting point temperature of 115° C. or less; and
        (ii) about 5 to about 95 wt % of a filler, the wt % based upon the total weight of the masterbatch; and
    (b) about 1 to about 99 wt % of a propylene-based polymer comprising about 80 to about 100 mol % of units derived from propylene and a peak melting point temperature of greater than 115° C.
2. The film tapes of 1, wherein the masterbatch has a melt flow rate of about 1 dg/min to about 50 dg/min.
3. The film tapes of 1 or 2, wherein the filler is a salt.
4. The film tapes of 3, wherein the salt is calcium carbonate.
5. The film tapes of any of 1-4, wherein the comonomer is ethylene.
6. The film tapes of any of 1-5, wherein the propylene-based elastomer comprises about 72 to about 93 mol % of units derived from propylene and about 7 to about 28 mol % of units derived from the $C_2$-$C_{20}$ comonomer.
7. The film tapes of any of 1-6, wherein the propylene-based elastomer is substantially isotactic.
8. The film tapes of any of 1-7, wherein the propylene-based polymer is polypropylene.
9. The film tapes of any of 1-8, wherein the propylene-based polymer has a melt flow rate of 0.1 to 35 dg/min.
10. The film tapes of any of 1-9, wherein the propylene-based polymer has a melting point of at least about 130° C.
11. The film tapes of any of 1-10, wherein the composition comprises about 1 to about 70 wt % of the masterbatch and about 30 to about 99 wt % of the propylene-based polymer, the wt % s based upon total weight of the composition.
12. The film tapes of any of 1-11, wherein the composition comprises about 1 to about 50 wt % of the masterbatch and about 50 to about 99 wt % of the propylene-based polymer, the wt % s based upon total weight of the composition.
13. The film of any of 1-12, wherein the propylene-based elastomer has a heat of fusion of about 10 to about 75 J/g.
14. The film tapes of 13, wherein the film tapes form one or more of a molded part, carpet yarn, carpet fiber, carpet backing, bag, artificial grass, rope or non-woven fabric.
15. A process for making a composition comprising:
    (a) forming a masterbatch comprising a blend of:
        (i) about 5 to about 95 wt % of a propylene-based elastomer, the wt % based upon total weight of the masterbatch, the propylene-based elastomer having about 50 to about 99 mol % units derived from propylene, about 1 to about 50 mol % of units derived from a $C_2$-$C_{20}$ comonomer and a peak melting point temperature of 115° C. or less; and
        (ii) about 5 to about 95 wt % of a filler, the wt % based upon the total weight of the masterbatch; and
    (b) blending the masterbatch with a propylene-based polymer comprising about 80 to about 100 mol % of units derived from propylene and a peak melting point temperature of greater than 115° C.
16. The process of 15, wherein the composition comprises about 1 to about 70 wt % of the masterbatch and about 30 to about 99 wt % of the propylene-based polymer, the wt % s based upon total weight of the composition.
17. The process of any one of 15-16, wherein the filler is calcium carbonate.
18. The process of any one of 15-17, wherein the masterbatch has a melt flow rate of about 1 dg/min to about 50 dg/min.
19. The composition of any one of 15-18, wherein the propylene-based elastomer comprises about 72 to about 93 mol % of units derived from propylene and about 7 to about 28 mol % of the $C_2$-$C_{20}$ comonomer.
20. The process of any one of 15-19, further comprising forming the composition into a film.
21. The process of 20, further comprising at least partially orienting the film.
22. The process of 20 or 21, wherein the film is at least partially oriented in the machine direction.
23. The process of any one of 20-22, further comprising slitting the film into tapes.
24. The process of 23, further comprising forming the tapes into a fabric.
25. The process of 24, further comprising forming the fabric into one or more of a molded part, carpet yarn, carpet fiber, carpet backing, bag, artificial grass, rope or non-woven fabric.

The embodiments and tables set forth herein are presented to best explain herein and its practical application and to thereby enable those skilled in the art to make and use the invention. However, those skilled in the art will recognize that the foregoing descriptions and tables have been presented for the purpose of illustration and example only. The description as set forth is not intended to be exhaustive or to limit the invention to the precise form disclosed. Many modifications and variations are possible in light of the above teaching without departing from the spirit and scope of the claims. Moreover, the term "comprising" is considered synonymous with the term "including" for purposes of Australian law.

We claim:
1. Film tapes comprising a blend of:
    (a) about 5 to about 35 wt % of a masterbatch comprising:
        (i) about 5 to about 95 wt % of a propylene-based elastomer, the wt % based upon total weight of the masterbatch, the propylene-based elastomer having:
            A. about 50 to about 99 mol % of units derived from propylene;
            B. about 1 to about 50 mol % of units derived from at least one $C_2$-$C_{20}$ comonomer; and
            C. a peak melting point temperature, measured by differential scanning calorimetry, of 115° C. or less; and
        (ii) about 5 to about 95 wt % of a filler, the wt % based upon the total weight of the masterbatch; and
    (b) about 65 to about 95 wt % of a propylene homopolymer having a peak melting point temperature, measured by differential scanning calorimetry, of greater than 130° C. and a melt flow rate, measured according to ASTM D-1238 (230° C./2.16 kg), of 0.1 to 35 dg/min.
2. The film tapes of claim 1, wherein the masterbatch has a melt flow rate, measured according to ASTM D-1238 (230° C./2.16 kg), of about 1 dg/min to about 50 dg/min.
3. The film tapes of claim 1, wherein the filler is a salt.

4. The film tapes of claim 3, wherein the salt is calcium carbonate.

5. The film tapes of claim 1, wherein the comonomer is butene, hexene, octene or mixtures thereof.

6. The film tapes of claim 1, wherein the propylene-based elastomer comprises about 72 to about 93 mol % of units derived from propylene and about 7 to about 28 mol % of units derived from the $C_2$-$C_{20}$ comonomer.

7. The film tapes of claim 1, wherein the propylene-based elastomer is substantially isotactic.

8. The film tapes of claim 1, wherein the propylene-based elastomer has a heat of fusion, measured according to ASTM E 794-85, of about 10 to about 75 J/g.

9. The film tapes of claim 8, wherein the film tapes form one or more of a molded part, carpet yarn, carpet fiber, carpet backing, bag, artificial grass, rope or non-woven fabric.

10. A process for making a composition comprising:
   (a) forming a masterbatch comprising about 5 to about 35 wt % of a blend of:
   (iii) about 5 to about 95 wt % of a propylene-based elastomer, the wt % based upon total weight of the masterbatch, the propylene-based elastomer having about 50 to about 99 mol % units derived from propylene, about 1 to about 50 mol % of units derived from a $C_2$-$C_{20}$ comonomer and a peak melting point temperature, measured by differential scanning calorimetry, of 115° C. or less; and
   (iv) about 5 to about 95 wt % of a filler, the wt % based upon the total weight of the masterbatch; and
   (b) blending the masterbatch with about 65 to about 95 wt % of a propylene homopolymer comprising about 80 to about 100 mol % of units derived from propylene and having a peak melting point temperature, measured by differential scanning calorimetry, of greater than 130° C. and a melt flow rate, measured according to ASTM D-1238 (230° C./2.16 kg), of 0.1 to 35 dg/min.

11. The process of claim 10, wherein the filler is calcium carbonate.

12. The process of claim 10, wherein the masterbatch has a melt flow rate, measured according to ASTM D-1238 (230° C./2.16 kg), of about 1 dg/min to about 50 dg/min.

13. The process of claim 10, wherein the propylene-based elastomer comprises about 72 to about 93 mol % of units derived from propylene and about 7 to about 28 mol % of the $C_2$-$C_{20}$ comonomer.

14. The process of claim 10, further comprising forming the composition into a film.

15. The process of claim 14, further comprising at least partially orienting the film.

16. The process of claim 14, wherein the film is at least partially oriented in the machine direction.

17. The process of claim 14, further comprising slitting the film into tapes.

18. The process of claim 17, further comprising forming the tapes into a fabric.

19. The process of claim 18, further comprising forming the fabric into one or more of a molded part, carpet yarn, carpet fiber, carpet backing, bag, artificial grass, rope or non-woven fabric.

* * * * *